Aug. 13, 1940.  C. H. OSHEI  2,211,154
PRESSURE GENERATOR FOR MOTOR VEHICLES
Filed July 3, 1935  2 Sheets-Sheet 1
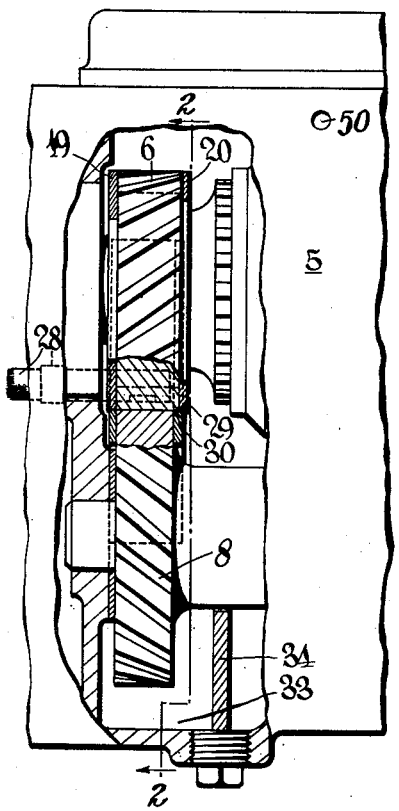
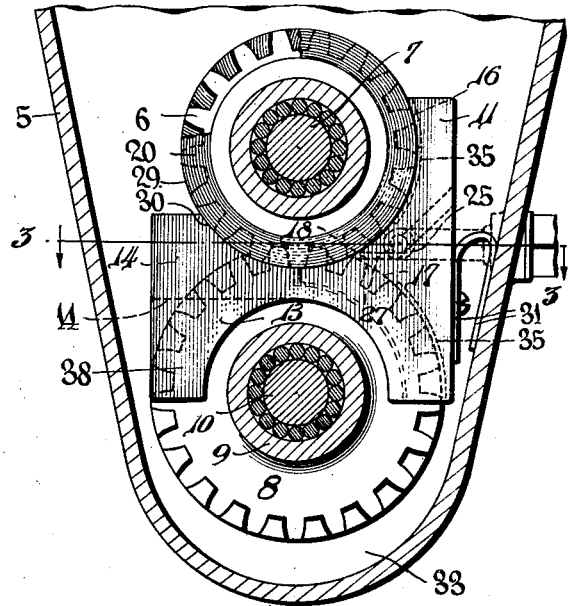
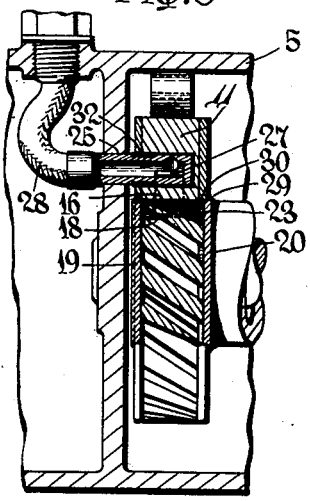
INVENTOR
Charles H. Oshei,
BY
Beau, Brooks, Buckley & Beau.
ATTORNEYS Aug. 13, 1940.  C. H. OSHEI  2,211,154
PRESSURE GENERATOR FOR MOTOR VEHICLES
Filed July 3, 1935  2 Sheets-Sheet 2
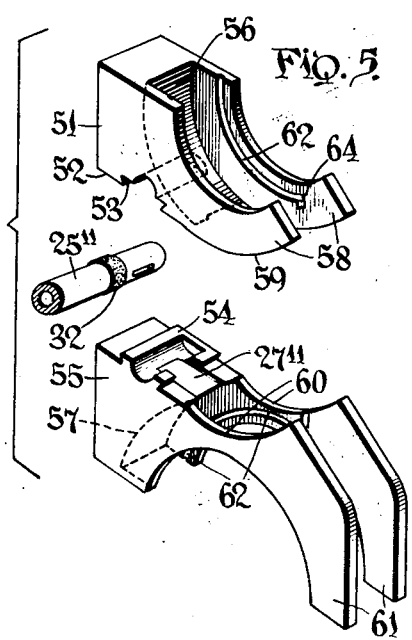
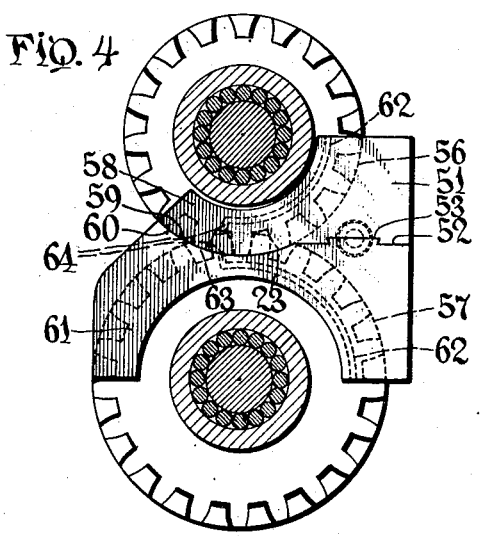
INVENTOR
Charles H. Oshei,
BY
Beau, Brooks, Buckley & Beau.
ATTORNEYS Patented Aug. 13, 1940

2,211,154

UNITED STATES PATENT OFFICE 2,211,154

PRESSURE GENERATOR FOR MOTOR VEHICLES

Charles H. Oshei, Detroit, Mich.

Application July 3, 1935, Serial No. 29,752

8 Claims. (Cl. 230—141)

This invention relates to the motor vehicle art and has reference to the adaptation of power transmitting gears for the generation of pressure usable in the actuation of fluid actuated adjuncts and accessories.

In my prior Patent No. 2,105,259, granted January 11, 1938, means are provided for adapting the gears of the power transmitting units of a motor vehicle to serve as pump elements for the production of pressure, both below as well as above atmospheric. In certain units, such as in the speed changing transmission, there is a certain amount of lateral or axial play in the gears which is accentuated through end thrust when the teeth of the gears are cut on a spiral or on an angle. This lateral play or sidewise movement of the gears is relative and in opposite directions and is therefore cumulative, amounting to a considerable factor when desiring to maintain a good seal by the oil between the gears and the adaptor in order to secure the greatest efficiency.

An important object of the invention is to provide an improved adaptor for incorporation in a motor vehicle installation for converting two intermeshing gears thereof into air displacing members of an air pump. Further, the invention has for its object to provide an air pump adaptor having relatively movable sections, one section for each of the intermeshing gears, whereby the gears may function in their normal manner without restraint or hindrance by the presence of the adaptor and yet said adaptor at the same time serving to cooperate in an efficient and practical way with the gears to provide a reliable and steady source of air pressure influence for the operation of air actuated accessories and adjunct.

The invention has for its further object to provide an improved pump construction for motor vehicles having means incorporated by which a practical and definite clearance between the gears and the adaptor or housing can be maintained oil-sealed against air leakage, as will be hereinafter more fully described, reference being made to the accompanying drawings wherein Fig. 1 is a vertical sectional view through a power transmitting unit depicting another form of the invention;

Fig. 2 is a fragmentary sectional view at right angles of the disclosure of Fig. 1 and taken about on line 2—2 of said view;

Fig. 3 is a horizontal section about line 3—3 of Fig. 2;

Fig. 4 illustrates a modified sectionalized adaptor housing; and

Fig. 5 is a detailed perspective view of the individual sections of the adaptor housing.

Referring more particularly to the drawings, the numeral 5 designates the case or housing of a power transmitting unit, such as the speed changing transmission of a motor vehicle, this latter term being used in a generic sense and inclusive of other machines utilizing power transmitting gears. The clutch gear 6 is illustrated as being fixed on the shaft 7 leading to the engine crank shaft and connected therewith by the usual, interposed clutch. This gear 6 meshes with the counter or constant drive gear 8 which operates in a bath of oil and is fixed on the countershaft 9 that has rotative support on the fixed shaft 10. Other gears of the various units of a motor vehicle may be selected, if desired. The teeth of these gears in the present day motor vehicle are inclined or cut on a spiral so that there is a certain amount of end thrust during power transmission which tends to shift the gears laterally with respect to each other.

In my prior patent I disclosed an adaptor for converting two intermeshing gears of the motor vehicle power plant into a pump to serve as a source of fluid pressure for the operation of motor vehicle accessories. This adaptor embodied converging arcuate surfaces or walls for fitting the gear peripheries adjacent their point of mesh, and side walls or flanges for overlying the ends of the gear teeth at and adjacent the intermeshing point so as to form a pressure zone or chamber which was connected by a conduit to the accessory. In carrying this invention into practice, difficulty was encountered in adapting certain gears of the vehicle power plant due to the fact that in operation the gears developed a certain amount of sidewise or lateral play relative to each other and that this play movement after long usage would increase the clearance between the ends of the teeth and the side walls of the adaptor housing so that the efficiency of the device became impaired.

An important object of the present invention is to provide an adaptor or more broadly, to provide a pump, in which the portion of the housing enclosing the gears about their point of mesh will accommodate the lateral or end thrusts of the gears without altering the prescribed clearance thereby to maintain the efficiency of the pump throughout its life.

To this end the adaptor or pump housing is composed of relatively movable sections associated with the respective gears in such manner as to ride laterally with the individual gears without varying the clearance between the confining walls of the housing and the ends of the gear teeth.

Accordingly, the housing embodies a main section or body 11 having side walls or flanges 13 and 14 which receive the upper arc of the lower gear 9 therebetween so that the oil in which the lower gear normally operates within the housing 5 will effectively seal the clearance between the teeth and said confining flanges. Joining these flanges is an arcuate transverse wall 17 which merges with a second arcuate wall 16, concentric with the upper gear 6, along edge 18 adjacent the point of mesh. The companion section of the housing embodies the side walls or teeth confining flanges 19 and 20 which are associated with the upper gear so as to seal the latter adjacent the point of intermesh. The companion section is movable sidewise relative to the main section and both sections are so mounted as to move with the respective gears without resistance being offered by either gear.

The several walls form a chamber 23 between the teeth and about the edge 18 through which latter leads a port 27, which in turn is connected by a conduit 28 to the point of use, such as to one or more of the various fluid pressure operated accessories with which the present day motor vehicle is equipped. The conduit 28 may possess sufficient flexibility to permit of the shifting movement of the adaptor housing in accommodating the thrust movement of said gear 8 during its normal power transmitting functioning. Lateral movement of the gear 8 compels like movement of the respective section of the adaptor housing unrestricted by any forces tending to vary the clearance between the gear teeth and their confining walls. Therefore the power transmitting gear 8 will serve in an efficient manner, and as the intermeshing teeth of the gears move out of mesh, a low pressure condition will develop in the chamber 23 which is accessible through the port 27 for the operation of such accessories as may be desired.

In the embodiment depicted in Figs. 1, 2 and 3, the one set of the confining flanges 19 and 20 of the adaptor housing are slidably mounted on the housing body 11 having the companion set of flanges 13 and 14 so as to move laterally with their confined teeth as the respective gears play sidewise. These teeth confining flanges 19 and 20 are of annular form and have their peripheral edges 29 ground to the outside diameter of the concentric clutch gear 6 for lateral sliding support on the concentric bearing surfaces 30 formed in the body portion of the adaptor housing at opposite sides of the gear. Such ring shaped flanges are held in oil sealed contact with the ends of the teeth on their gear 6 and may be permanently attached to the sides of the gear so as to rotate therewith, as illustrated. The flanges 19 and 20, constituting one section of the adaptor housing, will therefore have rotary as well as lateral bearing on the surfaces 30. To insure proper sealing between the intermeshing teeth for the generation of the desired pressure, the gear 6 may be widened over the companion intermeshing gear to an extent equal at least to the combined maximum lateral play of both gears. Corresponding widening of the arcuate wall 16 will likewise follow. Consequently, lateral play of either one or both of the gears will be accommodated without impairing the efficiency of the power transmitting gears as pumping or fluid displacing members in the adapted pump.

The main body portion of the adaptor housing may be supported solely by a spring 31, which latter mounts at one end the adaptor housing 5 and has its opposite end secured on a fixed part of the transmission housing for normally urging the arcuate walls toward the peripheries of the gears to secure proper circumferential seal therewith. The adaptor housing is formed with an opening which receives the tubular pin 25, the opening being slightly larger than said pin so that the housing can move with respect thereto. The pin provides a convenient connection between the air port 27 and the flexible conduit 28. This clearance about the pin may be closed off from the interior of the transmission housing by a washer or bushing 32 which yields to permit proper functioning of the spring 31. The bushing 32 may be formed of a synthetic rubber capable of withstanding the high temperatures and the oil of the transmission housing.

Ordinarily there is sufficient oil or lubricant within the transmission housing for the gear 8 to operate in and this will normally insure proper sealing of its meshing engagement with its companion gear. However, if the gear 8 is located at the forward end of the transmission housing and the vehicle be suddenly started or accelerated, or be traveling upgrade, the main body of lubricant may surge or flow rearwardly and away from the pumping gears. On the other hand, if the gear 8 is disposed in the rear of the transmission housing and the vehicle is suddenly braked, or when descending a hill the lubricant would surge away from the gear. To prevent this surging of the sealing fluid from the gears, a transverse retaining wall or baffle 34 is provided in the lower portion 33 of the casing 5 to retain a safe quantity of the fluid about the gear 8 to maintain the efficiency of the pump.

In practical use, the power transmission gears will function in their primary capacity in the usual way, and secondarily as pumping elements to create the desired pressure in the chamber 23, sufficient to operate the accessory to which the chamber is connected. In their capacity as pumping members the gears will carry off the inflowing air by the peripheral pockets between the gear teeth and discharge it into the transmission housing as the teeth ride out of sealed contact with their confining walls. The air thus delivered to the transmission housing may escape therefrom through open bearings therein or through a specially devised and protected vent.

When the use of the accessory is discontinued and the conduit 28 closed against the admission of air into the chamber 23 any resultant noise originating in the adaptor housing by reason of the high vacuum therein may be successfully eliminated to a practical extent by opening the air pockets gradually to the interior of the transmission housing as by means of a venting groove 35 disposed in each of the arcuate walls 16 and 17. The groove is preferably disposed at one side of the wall so as to be uncovered by the leading or forward end of the inclined gear tooth and at a time after the succeeding gear tooth has sealed the intermediate air pocket against communication with the chamber 23.

Where the lower gear of the pump is partially immersed in its bath of oil, it is possible for the sealing oil to flow off the downwardly inclined teeth as the latter rise from the bath so that by the time such teeth move into mesh with the gear 8 the supply of sealing oil on the teeth is largely wasted or depleted. To insure against such drainage of the sealing oil from the rising teeth the corresponding one of the teeth confining flanges is extended downwardly, as at 38, Fig. 6, whereby the lower ends of the teeth from the oil level to the meshing point are covered in a manner to retain a large proportion of the oil on the teeth as they advance to the meshing point.

The plural sections of the adaptor housing may be slidably interlocked into a unit, as shown in Figs. 4 and 5 wherein the upper section 51 is herein depicted as having a bearing face 52 provided with a groove 53 to slidably receive a transverse rib 54 of dovetail section formed in the companion and supporting section 55. Each section has a pair of teeth confining flanges connected by a transverse arcuate wall concentric with its associated gear. The arcuate walls 56 and 57 merge into each other along an edge through which the air port 27'' opens, and the air port may lead to a suitable point of pressure take-off, as to the guiding and mounting pin 25''. The teeth confining flanges of one of the adaptor housing sections will follow the curvature of the teeth of the adjacent gear. For instance, the flanges 58 of the upper section 51 are formed with convex edges 59 concentric with the upper gear and fitting in the concave bearing surface 60 provided on the flanges 61 of the companion section 55.

This construction provides a sectional adaptor housing which may be mounted and demounted as a unit and one wherein the sections bodily move with the individual gears as they relatively play.

As a further seal and protection against the admission of air into the pressure chamber 23 from the interior of the transmission housing the several teeth confining flanges may be provided with arcuate oil grooves 62 disposed inwardly from the base of the teeth to receive oil under pressure from a suitable supply. This supply is novelly provided by tapping the pressure chamber 63 at the opposite side of the point of mesh. For instance, where the pressure chamber 23 is for negative or sub-atmospheric pressure, the opposite pressure chamber 63 will be under a positive pressure and the oil delivered thereto by the gear teeth as they approach the intermeshing point will be forced out through radial extensions 64 of the grooves 62 and out through the latter into the transmission housing. This in effect provides a line of seal at the suction side along which the sealing liquid flows under a high pressure. This pressure seal is insured by the pressure built up as the teeth go into mesh and serves to relieve any expanding influence of the oil pressure on the flanges which might tend to decrease the efficiency of the adapted pump or impair the operation of the gears as power transmitting elements. Where the gear teeth are cut on an angle it may be desirable to offset the radial extensions 64 more in accord with the angle of the teeth for better relieving the pressure on the teeth confining flanges.

By reason of the adaptor means herein disclosed a definite clearance is obtained which may be perfectly sealed by the lubricant for the greatest efficiency in the generation of pressure. In having the adaptor housing responsive to lateral play of the individual gears the latter are not subjected to additional strain in performing their power transmitting functions, and the liquid seal is maintained constant, provision being made for an adequate supply of the sealing liquid.

The dual functioning of the transmission gears permit the use of the larger transmission gears as pump elements, and while the adaptor is herein disclosed as being removable to facilitate assembly, it may be made a more permanent part of the case if the engineering specifications so require.

While the invention has been particularly described in connection with motor vehicles, it will be understood that the construction described and shown herein is merely illustrative of the inventive principles involved, which may be applied to other physical embodiments without departing from the scope and spirit of the invention claimed.

What is claimed is:

1. A pump comprising intermeshing gears, side rings fixed over the ends of the teeth of one gear to close the intervening pockets, a section embracing the sides of the companion gear adjacent the point of mesh to close the adjacent pockets, said section having arcuate bearings receiving the side rings for lateral play and two arcuate walls, each concentric with a respective gear and in oil sealed peripheral contact therewith, said arcuate walls diverging from adjacent the point of mesh, said section and rings defining a pressure chamber into which a port opens through said section.

2. A pump comprising a housing, intermeshing gears therein, side rings fixed over the ends of the teeth of one gear to close the intervening pockets, a section embracing the sides of the companion gear adjacent the point of mesh to close the adjacent pockets, said section having arcuate bearings receiving the side rings for lateral play and two arcuate walls, each concentric with a respective gear and in peripheral contact therewith, said arcuate walls diverging from adjacent the point of mesh, said section and rings defining a pressure chamber and said section having an opening communicating with the pressure chamber, and a tubular mounting pin extending from the housing and engaging in the section opening to support the same, said pin constituting a conduit for connection to the pressure chamber.

3. A pump comprising a casing, intermeshing gears subject to relative lateral play therein during operation, housing means supported within the casing and cooperating with the gears about their point of mesh for the pumping of fluid, said housing means having wall portions overlying the opposite ends of the teeth of one gear about the point of mesh and freely movable sideways with such gear as the latter plays within the casing, said housing means having other wall portions overlying the opposite ends of the teeth of the companion gear adjacent the point of mesh and freely movable sideways with such companion gear as the latter plays within the casing, the wall portions which cooperate with one gear having laterally slidable support on the wall portions associated with the other gear therewith to form a chamber for enclosing the intermeshing gears about their point of mesh, and fluid passage means leading from the chamber.

4. A pump adaptor for converting a pair of intermeshing spiral gears into a pump, said adaptor comprising means having wall portions for overlying with a predetermined clearance the end faces of the teeth of one of the gears adjacent the point of intermesh and other wall portions overlying with a like predetermined clearance the end faces of the teeth of the companion gear adjacent the point of intermesh, the adaptor wall portions for each gear being freely movable by and with such gear and laterally slidable with respect to and on the associated wall portions whereby to maintain such predetermined clearances while permitting relative lateral play of and between the gears incidental to their operation, and a port for said adaptor for utilizing the pressure produced by the intermeshing gears operating in cooperation with said adaptor.

5. A pump comprising a casing, two intermeshing gears therein, two housing sections relatively movable sideways to permit relative sideways play between the gears, one section for each gear freely movable thereby in such sideways play, said sections adapted for enclosing the gears about their meshing teeth to cooperate therewith for the pumping of fluid, and one section including a side ring fixed on its associated gear to rotate as well as play sideways therewith, the companion section fitting the periphery of the ring for lateral sliding engagement therewith as its gear plays sideways.

6. A pump having intermeshing gear-like piston elements subject to sideways play one on the other, one element being wider than the other to an extent substantially equal to the lateral play of said elements, a housing enclosing the elements about their point of mesh to provide a chamber from which leads a fluid passage, said housing comprising two sections slidable one on the other laterally of the elements and in substantially fluid tight seal with each other and with the elements, one section being associated with each element and having side walls extending over the ends of the teeth of the latter, said housing having arcuate walls extending peripherally over each element from the chamber, and each section being laterally movable with and directly responsive to the sideways play of its own element independent of the companion section, and yieldable means supporting the housing for such individual response of its sections.

7. A pump having intermeshing gear-like piston elements subject to sideways play one on the other, one element being wider than the other to an extent substantially equal to the lateral play of said elements, and a chambered housing enclosing the elements about their point of mesh and comprising two sections, one section for each element and each section having side walls embracing the opposite ends of the teeth of said elements in sealed contact therewith, one section being laterally slidable on the companion section and responsive to the sideways play of its associated element independently of the companion section.

8. A pumping arrangement comprising a casing, intermeshing gear elements within the casing subject to sidewise play during operation, an independent housing within the casing having relatively movable sections, one for each gear element and each section having side walls forming a chamber enclosing the teeth of the gear elements at one side of and about their point of mesh, means within the casing resiliently supporting the housing in such manner as to yield sidewise of the gears as well as from and toward the point of mesh to maintain the housing in proper relation to the gear elements, and passage means leading from the housing chamber through the casing and so arranged as to permit such independent yielding movement of the housing.

CHARLES H. OSHEI.